Figure 1:
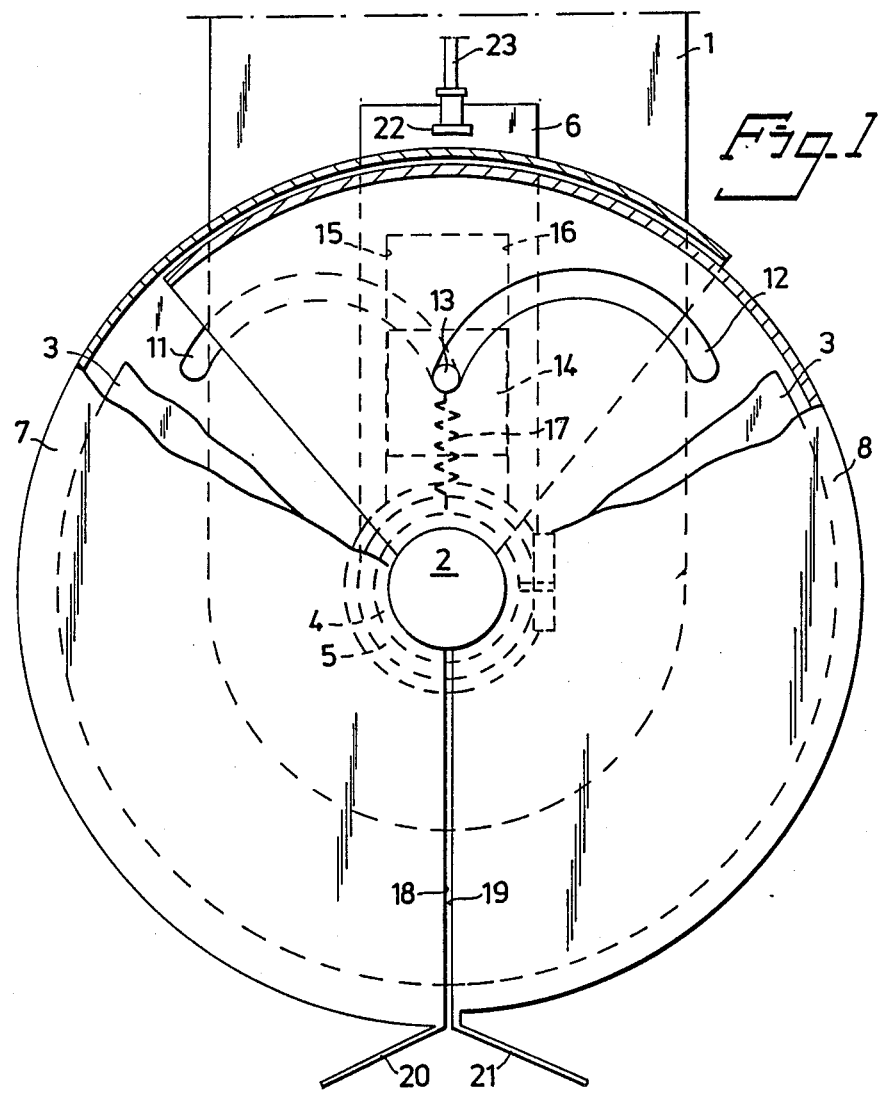

United States Patent [19]

Mickos

[11] Patent Number: 4,711,055

[45] Date of Patent: Dec. 8, 1987

[54] DISPLACEABLE PROTECTIVE COVER FOR HANDTOOLS PROVIDED WITH ROTATABLE DISC-SHAPED TOOLS

[76] Inventor: Kaj Mickos, Prinsvagen 10, S-131 46 Nacka, Sweden

[21] Appl. No.: 909,578

[22] PCT Filed: Feb. 18, 1986

[86] PCT No.: PCT/SE86/00068

§ 371 Date: Sep. 22, 1986

§ 102(e) Date: Sep. 22, 1986

[87] PCT Pub. No.: WO86/04855

PCT Pub. Date: Aug. 28, 1986

[30] Foreign Application Priority Data

Feb. 25, 1985 [SE] Sweden ................................ 8500931

[51] Int. Cl.⁴ ............................................. B24B 55/04
[52] U.S. Cl. ........................................ 51/268; 83/397; 83/478; 125/13 R
[58] Field of Search ............... 51/268, 269; 125/13 R; 30/391; 83/397, 478, 546; 144/251 R

[56] References Cited

U.S. PATENT DOCUMENTS

| | | | |
|---|---|---|---|
| 1,208,765 | 12/1916 | Fow | 83/546 |
| 1,402,959 | 1/1922 | Quinton | 83/546 |
| 1,464,924 | 8/1923 | Drummond | 83/478 |
| 2,589,309 | 3/1952 | Tompkins | 83/478 |
| 3,913,437 | 10/1975 | Speer | 83/478 |
| 4,033,218 | 7/1977 | Donatelle | 83/397 |
| 4,318,324 | 3/1982 | Hall | 83/397 |

Primary Examiner—Harold D. Whitehead
Attorney, Agent, or Firm—Kinzer, Plyer, Dorn, McEachran & Jambor

[57] ABSTRACT

The invention relates to a displaceable protective cover for handtools using rotary, disc-shaped tools. The protective cover comprises two halves (7,8) which completely enclose the tool (3) when in their rest position. The cover-halves (7,8) can be rotated to an open position against the action of a spring force, and are connected to a latching mechanism (11,12), arranged to lock the cover-halves against further rotation when either of the cover-halves (7,8) is subjected to an impact force.

3 Claims, 3 Drawing Figures

U.S. Patent    Dec. 8, 1987    4,711,055

DISPLACEABLE PROTECTIVE COVER FOR HANDTOOLS PROVIDED WITH ROTATABLE DISC-SHAPED TOOLS

The present invention relates to a displaceable protective cover, or guard, for handtools provided with rotatable, disc-shaped tools, such as disc cutters, grinding discs, circular sawblades etc.

Protective covers, or guards, of this kind are known to the art, and in particular in connection with circular saws, and comprise a stationary part and a displaceable part, this latter part, when in its rest position, together with the stationary part completely embracing the saw blade. The protective cover prevents personal contact with the tool and also protects the operator from flying chips, shavings etc.

Hand-operated cutting and grinding machines are used in a different manner than circular saws, and a protective cover of the aforesaid kind would present a serious obstacle in the operation of such machines. Consequently, there is used in conjunction with such machines a protective cover or guide of simpler construction which does not offer any protective function in the true sense of the word, despite the fact that these machines are the most dangerous to use. Because of its great mass, a cutting and grinding disc will continue to rotate at a high speed long after the drive motor has been switched off, and consequently a protective cover which fully encloses the disc would seem an obvious necessity. If it were possible to provide a protective cover of this kind which would not make the cutting and grinding work involved difficult to carry out, it might then be possible to reduce the amount of red-hot chips, dust etc. which are flung from the machine to the surroundings in work of this nature, or even to eliminate such an occurrence.

In order for the protective cover to live up to its name, it must be capable of preventing accidents should the tool throw to one side, i.e. move violently, as often occurs with both circular saws and with grinding and cutting machines. When a tool throws it moves extremely violently, and when the protective cover provided includes a displaceable part, the cover is likely to be moved to a position in which the tool is fully exposed. It is also possible that the workman will completely lose his grip on the handtool in such eventualities.

The object of the invention is to provide a protective cover which will practically totally obviate the aforesaid risks with all of the aforementioned kinds of handtools, without rendering the tool difficult to use to any appreciable extent.

This object has been achieved with a protective cover or guard means according to the invention having the characteristic features set forth in the following claims. The invention is based on the concept that when in its rest position the protective cover will fully embrace the rotary tool. In addition, it shall also be possible in the majority of cases to open the protective cover, by bringing the handtool into normal engagement with a workpiece. Moreover, it shall not be possible under any circumstance, for any of the displaceable cover-halves to be thrown up when subjected to impact, for example due to involuntary, violent movement, or throw, of the handtool.

This latter facility can be achieved in several ways. For example, both cover-halves may be provided with a latching mechanism which locks the cover-halves against continued rotary movement when the speed of rotation becomes excessively high, i.e. similar to the effect achieved with automatically coilable, vehicle safety belts.

The said facility can also be realized with a latching mechanism constructed to allow the two cover-halves to rotate synchronously from their rest position, and to lock the cover-halves against further rotation when one of said cover-halves has been rotated through an angle greater than the other. In this case, the handtool must be handled in such a manner that both cover-halves are pressed apart by the workpiece with substantially the same pressure. Tests have shown that this can be very readily achieved. This construction also imparts a highly valuable property to the handtool, inasmuch as the handtool will work the workpiece positively with the tool directed towards avoiding the circumstances under which the tool is liable to throw; since the two cover-halves are connected together, they are always opened through mutually the same angle, so that when cutting pipe or tubing for example, the center line of the pipe is guided towards the mid-way line between the edges of the two cover-halves, i.e. these edges can be used as a support when cutting the pipe, thereby preventing the cutting tool from throwing.

Figure 2:
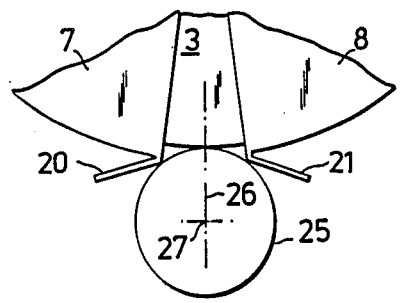
Figure 3:
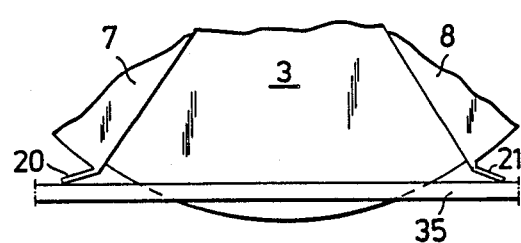

An exemplifying embodiment of a protective cover according to the invention will now be described in more detail with reference to the accompanying drawing, in which FIG. 1 illustrates the protective cover from above, and partly in section, with a handtool located beneath the protective cover;

FIG. 2 is a partial view which shows the engagement of the tool with a pipe to be cut; and FIG. 3 is a partial view between the tool and a metal sheet to be sawed.

FIG. 1 illustrates a handtool 1 of a general, known kind for use when grinding and cutting or when sawing a workpiece. The handtool includes a shaft 2, to which there is attached a disc-shaped tool 3. The handtool also includes a collar 4 which is concentrical with the shaft 2 and on which an attachment sleeve 5 provided on a stationary part 6 of the protective-cover assembly is mounted in a conventional manner. The protective-cover assembly comprises two halves 7,8 which are rotatably journalled on the attachment sleeve 5. The cover-half 8 is somewhat smaller than the cover-half 7 and projects slightly thereinto; in order to show this clearly in the figure, the upper sides of the two cover-halves have been partially cut away, as has also a sector of the rotatable tool 3, which in this instance is assumed to be a cutting disc.

Each of the cover-halves 7,8 is provided on its respective underside with a through-passing track 11,12, these tracks intersecting one another. Arranged beneath the cover-half 7 is a slide 14 which is radially movable in the stationary part 6 and from which a guide post 13 extends up through the two tracks 11,12 in the point of intersection thereof. The slide is guided by two substantially radial edges 15,16, which are slightly serrated or toothed, as are also the slide edges of the slide. The post 13 is biased radially inwards by a draw spring 17 extending between the post 13 and the attachment sleeve 5.

Attached to the mutually opposing edges 18,19 of the cover-halves 7,8 are two obliquely and outwardly extending guide-lips 20,21. A brake shoe 22 is mounted on the stationary part 6. The brake shoe can be applied to the peripheral surface of the cover-half 7 and is manouvered with the aid of a Bowden cable and a press button or the like not shown, provided on one of the handles of the handtool, should it be necessary to hold the two cover-halves temporarily in their open position. The tracks 11 and 12 are so formed that when either of the cover-halves is subjected to a force acting in the opening direction, the post 13 will transmit to the slide 14 a force which urges the slide towards either of said radial edges 15,16, the direction of force on the post 13 being such that the sum of the spring force and the frictional force between the slide 14 and a respective side edge 15 or 16 is greater than the radially upwardly directed force component acting on the post 13, i.e. the slide 14 is locked.

When, on the other hand, both of the cover-halves are subjected to an equal force in the opening direction, the force component on the post 13 is doubled, at the same time as the slide 14 is positioned centrally between the edges 15,16, so that the frictional force ceases, i.e. the slide 14 is displaced radially outwards whereas the two cover-halves 7,8 are rotated synchronously in a respective clockwise and anti-clockwise direction.

The cover-halves 7,8 can be rotated through an opening angle determined by the length of the tracks 11,12, although if either of the guide-lips 20,21 has been subject to impact prior hereto, the slide 14 is pressed against the fixed edge 16 or 15 respectively, and the slide 14 is immediately locked until the pressures exerted on the post 13 by the two cover-halves 7,8 are equally great as one another, whereupon the two cover-halves can again be rotated in the opening direction during the continued outward movement of the slide 14.

When this state ceases, the slide 14 is drawn radially inwards by the spring 17 and the cover-halves 7,8 are rotated back to the illustrated starting position by the guide post 13.

FIG. 2 illustrates the cutting of a pipe or tube 25. The guide-lips 20,21 force the cover-halves apart and the bisectrix 26 is automatically placed through the center line 27 of the pipe 25.

FIG. 3 illustrates the cutting of a sheet 35. The guide-lips are placed against the sheet, wherewith the cover-halves 7,8 rotate in the opening direction. When the tool has penetrated the metal sheet, the tool can be tilted slightly, so that only one guide-lip bears against the sheet. The cover-halves can then be locked in this opening position and a constant saw or cutting depth obtained.

It will be understood that the invention is not limited to the illustrated embodiment and that various modifications can be made within the scope of the following claims. For example, instead of using the aforesaid vehicle safetybelt type latching mechanism, or the illustrated mechanism incorporating guide tracks 11,12, there can be used a link mechanism which connects the post 13 to the two cover-halves. In addition, the two halves 7,8 can be returned to their rest positions solely or partially with the aid of clock springs in the attachment sleeve 5. The "jamming" effect of the slide can also be achieved without serrating the edges 15,16 and the side edges of the slide 14.

I claim:

1. A rotatably displaceable protective cover for a handtool having a driven shaft and a disc-shaped tool mounted on the driven shaft for rotation therewith, said protective cover including a pair of telescoping cover-halves mounted for rotation about the driven shaft from a fully closed position in which they fully enclose the disc-shaped tool to an open position where the cover-halves telescope inside each other to expose the disc-shaped tool, means to prevent one cover-half from opening substantially more than the other cover-half when a force is applied to only one of the cover-halves, while permitting the cover-halves to open by telescoping into each other in a synchronized rotational movement when substantially equal forces are applied to each cover-half.

2. The protective cover of claim 1 in which said means to prevent one cover-half from opening substantially more than the other cover-half includes a slide block that moves unimpededly as the cover-halves are opened in angular synchronization, but is forced into braking engagement with a stationary surface mounted on the handtool when one cover-half opens through a greater angular degree than the other cover-half.

3. The protective cover of claim 1 in which said means to prevent one cover-half from opening substantially more than the other cover-half includes arcuate slots formed in the cover-halves, with the arcuate slots positioned to intersect with each other, a pin mounted on the slide block and adapted to ride in the intersecting slots in the cover halves, and means to bias the slide and pin to urge the cover-halves to their closed positions.

* * * * *